Oct. 3, 1950 A. G. COOLEY 2,524,651

ELECTROOPTICAL SCANNING METHOD AND APPARATUS

Filed Jan. 9, 1947 5 Sheets-Sheet 1

INVENTOR
AUSTIN G. COOLEY
BY John J. Rogan
ATTORNEY

INVENTOR
AUSTIN G. COOLEY
BY John J. Rogan
ATTORNEY

INVENTOR
AUSTIN G. COOLEY
BY John J. Rogan
ATTORNEY

Oct. 3, 1950 A. G. COOLEY 2,524,651

ELECTROOPTICAL SCANNING METHOD AND APPARATUS

Filed Jan. 9, 1947 5 Sheets-Sheet 4

INVENTOR.
AUSTIN G. COOLEY
BY John J. Rogan
ATTORNEY

Oct. 3, 1950 A. G. COOLEY 2,524,651

ELECTROOPTICAL SCANNING METHOD AND APPARATUS

Filed Jan. 9, 1947 5 Sheets-Sheet 5

INVENTOR.
AUSTIN G. COOLEY
BY John J Rogan
ATTORNEY

Patented Oct. 3, 1950

2,524,651

UNITED STATES PATENT OFFICE 2,524,651

ELECTROOPTICAL SCANNING METHOD AND APPARATUS

Austin G. Cooley, New York, N. Y., assignor to Times Facsimile Corporation, a corporation of New York Application January 9, 1947, Serial No. 721,085

17 Claims. (Cl. 178—7.1)

This invention relates to electro-optical scanning systems and more especially to facsimile scanning and the like.

A principal object of the invention is to provide an improved facsimile scanner employing a moving scanning light source and a stationary light-responsive cell.

It has been the usual practice heretofore in facsimile transmission machines to employ a so-called scanning head consisting of a light source, optical lens system and a light-sensitive cell, the head being moved mechanically by a lead screw or the like so as to traverse a linear path across the subject matter being scanned. One of the disadvantages of this conventional arrangement is that relatively long and flexible conducting wires must be provided between the cell and its associated amplifier which is stationarily located at a convenient point. These long external conductors between the cell and the amplifier are undesirable for a number of reasons, one of these is the liability to pick up stray electric fields whose effects are then passed to the cell amplifier and amplified therein. Another reason is the maintenance cost of replacing broken wires which must be flexible to allow of relative movement between the cell carriage and its amplifier. In an attempt to overcome these disadvantages, it has been proposed to incorporate the amplifier into the scanning head itself, however the amplifier tubes must be of special construction so as not to be microphonically affected by the mechanical riding motion of the scanning head.

Accordingly, it is a principal object of this invention to provide a scanning system which overcomes the above-noted disadvantages without unduly complicating the system.

A feature of the invention relates to a facsimile scanning arrangement wherein a scanning light source is moved, for example by a lead screw, transversely relative to the subject matter being scanned, and the light-sensitive cell is stationarily mounted with respect to the light source while maintaining a fixed spaced relation between the pick-up or condenser lens system and the scanned subject matter.

Another feature relates to a scanning head for facsimile machines and the like employing a pick-up lens system which is mounted on a swinging support while maintaining a fixed spaced relation between the said lens system and the subject matter being scanned and allowing the light-sensitive cell to be stationarily mounted with respect to the said lens system.

Another feature relates to a scanning arrangement for facsimile machines and the like, comprising a lens system which is supported on a swingable light confining tube pivotally mounted at a point near the light-sensitive cell and maintained in effective alignment with the cell and lens system during the entire scanning traverse of the lens system.

Another feature relates to a scanning arrangement comprising a scanning light source and lens unit which is carried by a two-piece telescoping light barrel pivotally mounted at one end adjacent the light-sensitive cell and at the other end supported on and moved by a lead screw.

A further feature relates to a facsimile scanner of the rotating drum and lead-screw type, having a pick-up lens system which is pivotally mounted adjacent a stationary photo-electric cell, and which is also pivotally supported on the lead-screw follower.

A further feature relates to a novel arrangement for loading a scanning drum with a sheet of subject matter to be scanned and for clamping one edge of the sheet to the drum; in conjunction with a special interlock between the motor circuit and the loading control. Ancillary to this feature, the mechanism which controls the sheet loading and clamping also controls a time delay switch in the motor circuit to insure that the drum is brought up to the proper speed before scanning takes place.

A still further feature relates to the novel organization, arrangement and relative location of parts which cooperate to provide an improved facsimile scanning machine.

Figure 1:
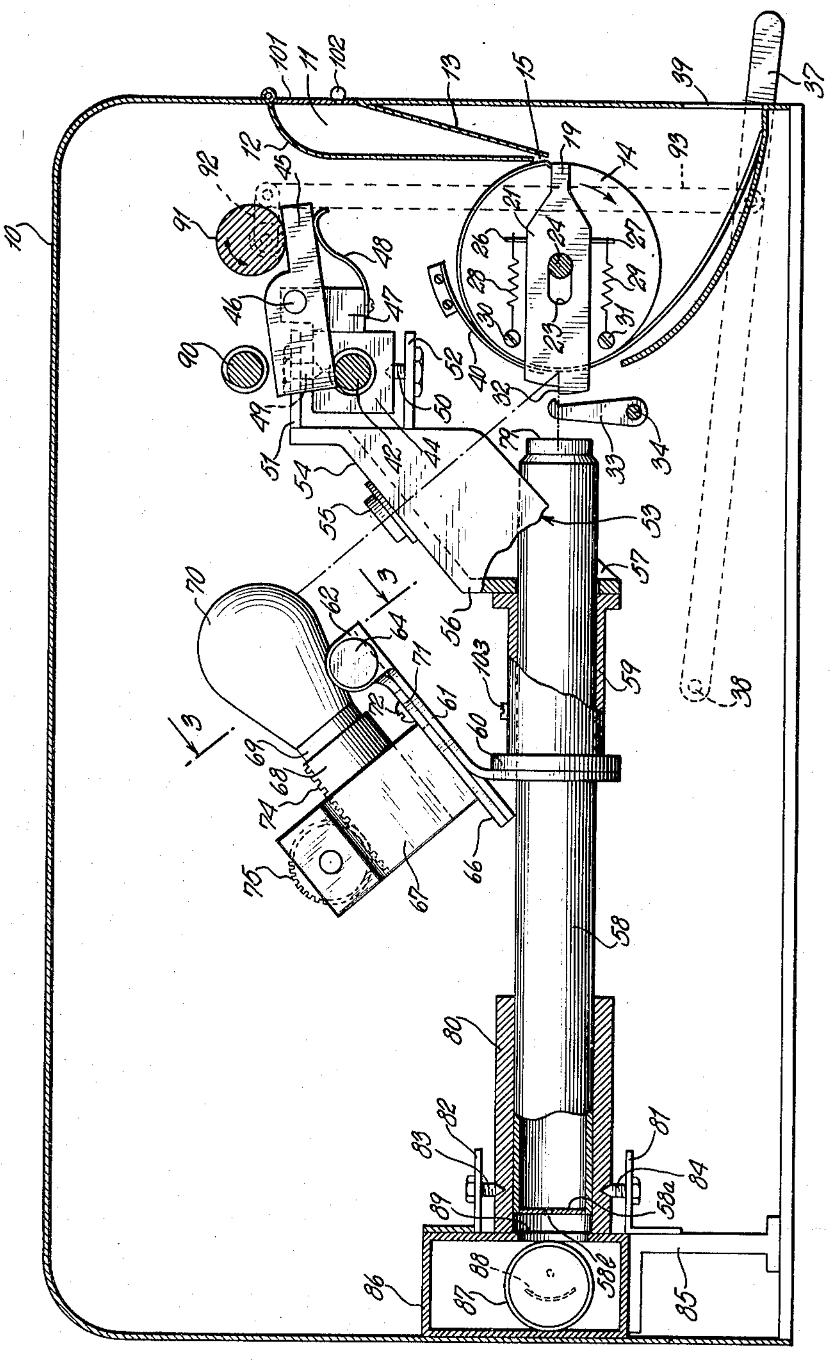
Fig. 1 is a left elevation view, partly sectional, of a facsimile scanning machine embodying features of the invention.
Figure 6:
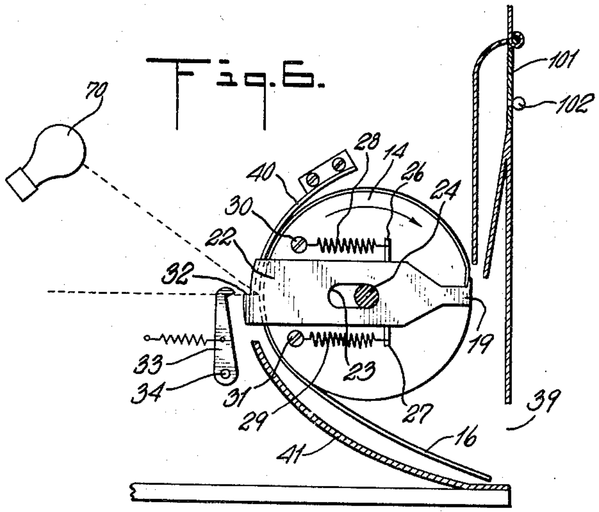
Figure 5:
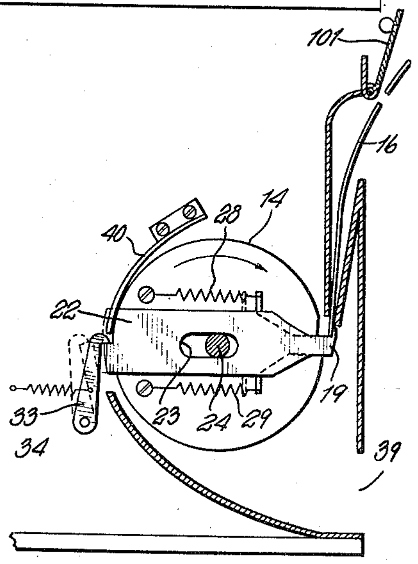

Figs. 5 and 6 are detailed views of the sheet clamping and loading arrangement of Fig. 1; Fig. 5 showing the clamp released and ready to reload the scanning drum with the sheet; Fig. 6 showing the sheet in clamped position on the drum.

Figure 7:
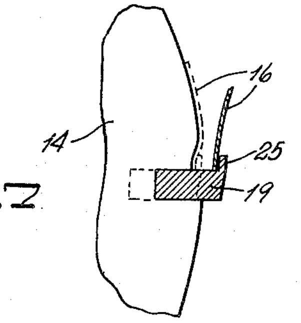

Fig. 7 is an enlarged sectional view of the sheet clamping bar of Figs. 1 to 6.

Figure 8:
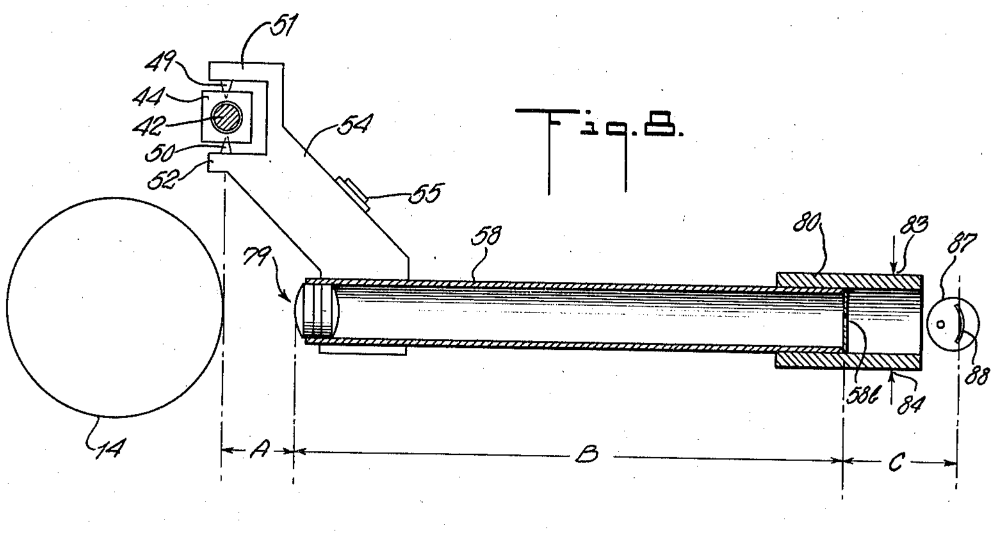

Fig. 8 is a detailed view of the pivotally mounted lens barrel showing more clearly its relation with respect to the scanning drum.

Figure 9:
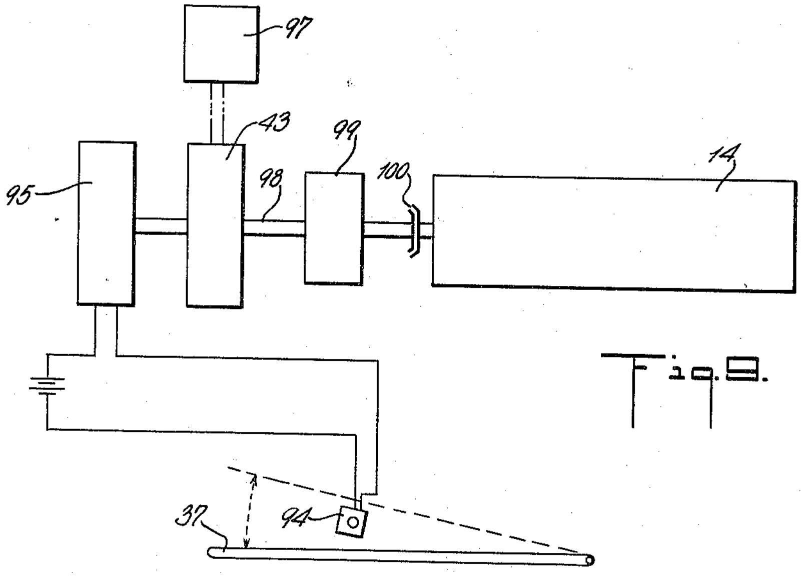

Fig. 9 is a schematic circuit diagram, mainly in block outline form, showing the motor control and clamping control lever interlock arrangement.

Figure 10:
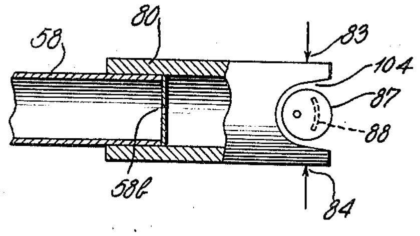

Fig. 10 is a sectional view of a modification of the lens barrel shown in Figs. 1 to 9.

Figure 11:
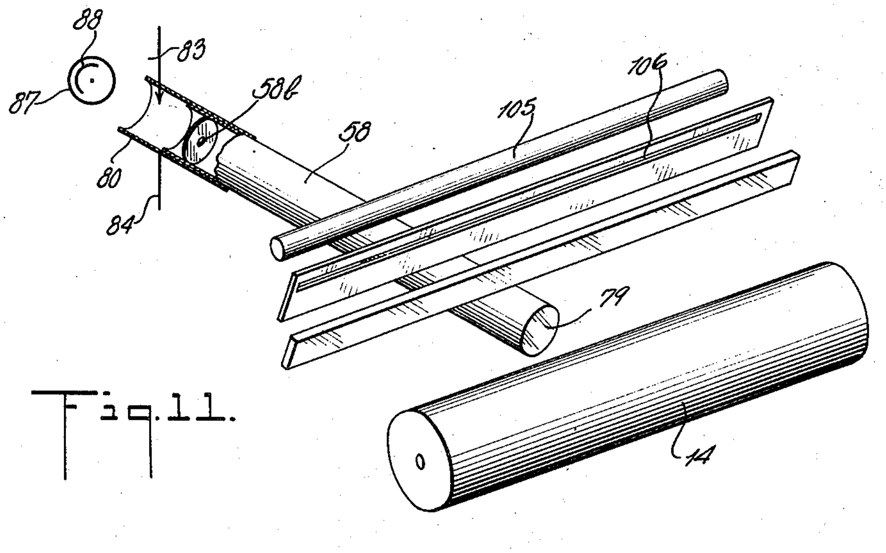
Figure 12:
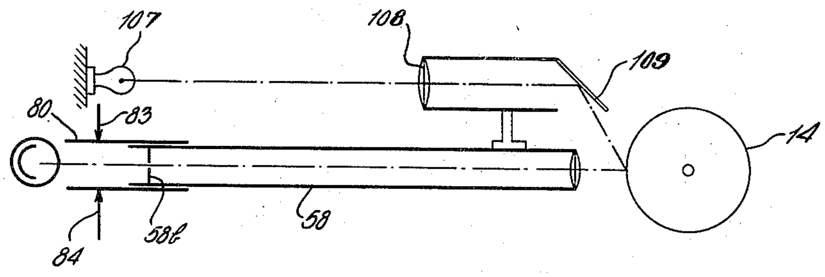

Figs. 11 and 12 are respective modifications of the scanning arrangements according to the invention.

Referring to Fig. 1, the numeral 10 represents an enclosing casing for the machine, this casing having at its front wall an inlet hopper or guide 11 formed of two reentrant plates 12, 13, which extend the full length of the scanning drum 14, and converge adjacent the periphery of the drum to form a loading slot 15. A sheet of paper 16 or other similar material containing the subject matter to be scanned is dropped into the hopper 11 for loading on the drum as will be described in connection with Figs. 5 and 6.

Suitably supported for rotation in fixed bearing plates 17, 18, is the cylindrical scanning drum 14 which has a longitudinal slot in its periphery to receive the paper clamping bar 19 which, as shown in Fig. 7, has a longitudinally extending groove lip 25 adapted to receive and clamp the edge of the sheet 16 against the periphery of the drum. Rigidly fastened to the ends of bar 19, or integral therewith, are the slotted guide plates 21, 22, each having a slot 23, through which the ends of the drum shaft 24 extend. The guide plates 21 and the integral clamping bar 19 are normally held in position as shown in Figs. 1 and 6, wherein the face 25 of the clamping bar is substantially flush with the periphery of the drum, the remaining width of the bar 19 being seated in the above-mentioned longitudinal slot in the drum. For this purpose, each of the plates 21, 22 has a pair of lugs 26, 27, and corresponding tension springs 28, 29, whose ends are fastened to the end walls of the drum by means of respective screws 30, 31.

Figure 4:
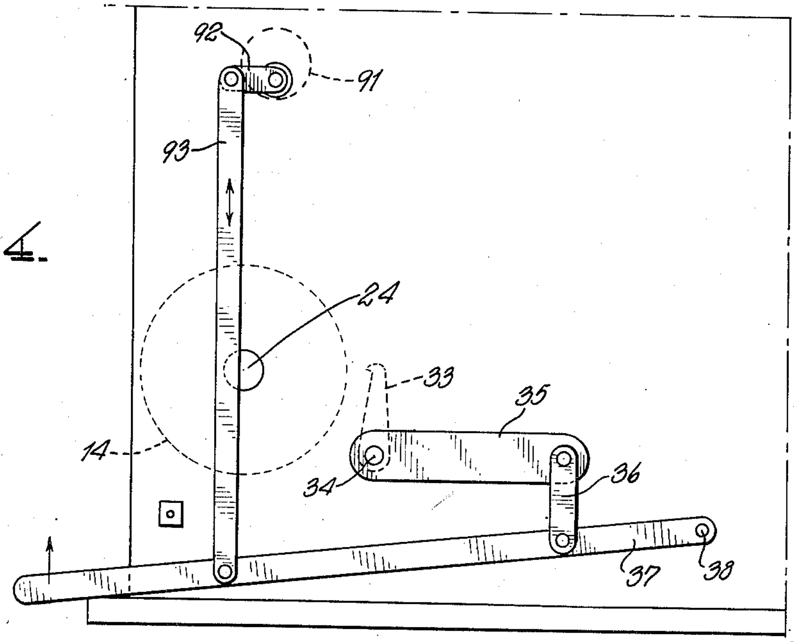
Fig. 4 is a right elevation view of part of Fig. 1.

The left-hand end of one of the plates 21 or 22 is provided with a lip 32 which is adapted to be engaged by a shiftable latch member 33. Member 33 is fastened to a rocker shaft 34 to which is also fastened the crank arm 35 (Fig. 4). The opposite end of arm 35 is connected by a link 36 to a lever 37, which is pivotally mounted at 38. The lever 37 extends through an opening 39 in the front wall of the casing 10 so that it may be raised or lowered. This opening also serves as an exit opening for removal of the sheet 16 after it has been completely scanned. The weight of the lever 37 may be such as to maintain it in its lowermost position as shown in Figs. 1 and 4. In this position, the latch member 33 is located out of the path of the lip 32 and the drum 14 is free to rotate. It should be observed that the plates 12 and 13 extend to, or short of, the ends of drum 14 so as to provide a clear path for the overhanging lip portions 32 when the drum is rotating. Mounted adjacent the upper rear quadrant of the drum 14 is a curved paper tension spring 40, which extends along the length of the drum and is adapted to hold the paper flat against the surface of the drum at the scanning region. Beneath the drum is located a curved stationary plate 41 which forms with openings 39 an exit hopper for the paper after it has been released from the drum.

Figures 2, 3:
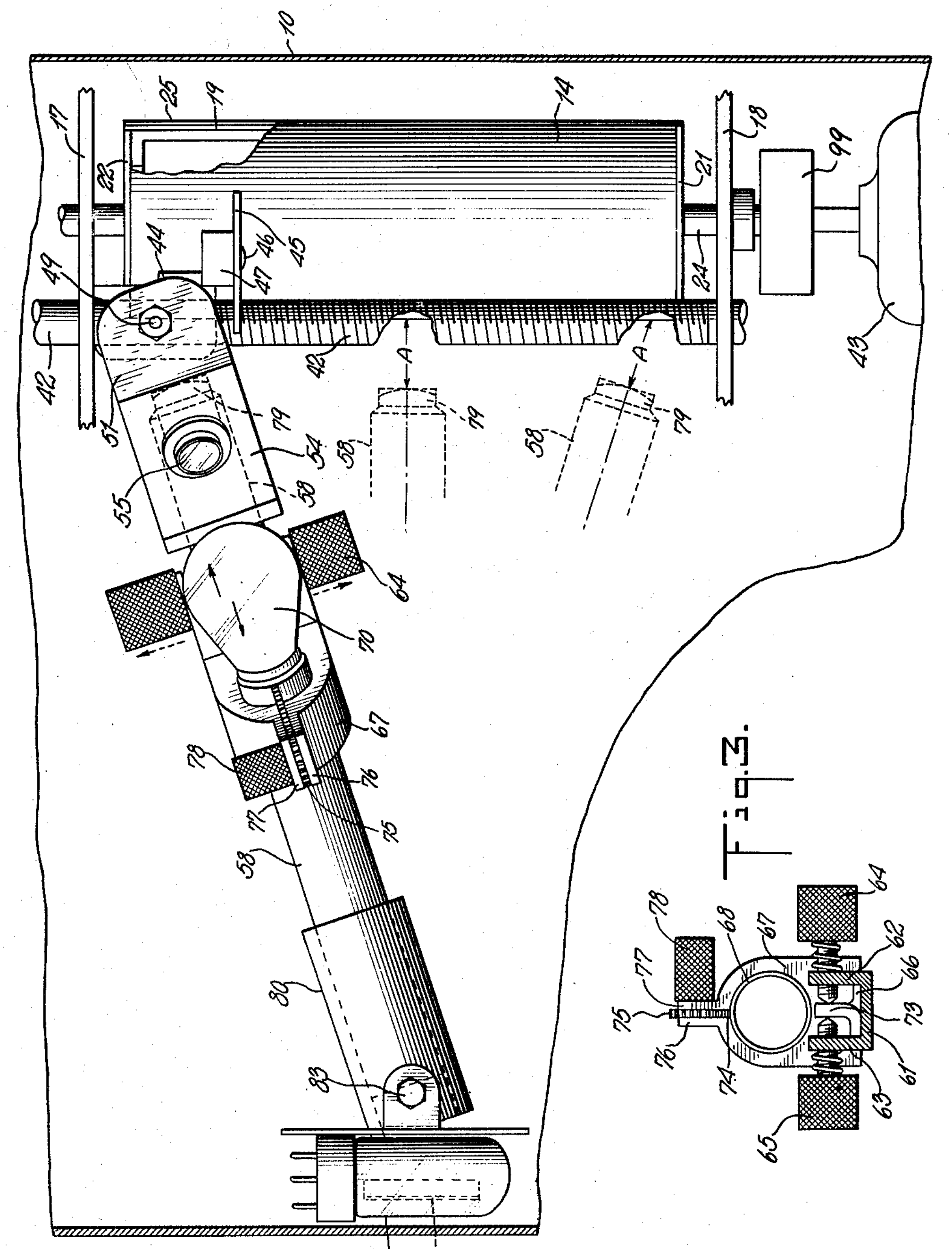
Fig. 2 is a top plan view of part of Fig. 1, with certain parts omitted for the sake of clarity.
Fig. 3 is a sectional view of Fig. 1, taken along the line 3—3 thereof, and viewed in the direction of the arrows, but with the lamp bulb removed.

Mounted for rotation in the bearing plates 17, 18, is a lead screw 42 (Figs. 1, 2 and 8), which is driven in predetermined and fixed speed relation with respect to the rotation of drum 14 by a suitable motor 43, through suitable reduction gearing (not shown) between the drum shaft and the lead screw 42. The screw 42 passes through a metal block 44 having a circular bore therein which is slightly greater in diameter than the peripheral diameter of the screw 42. The block 44 acts as a follower of the lead screw threads. For this purpose, a metal bar 45 is pivoted at 46 in an extension 47 on block 44. A leaf spring 48 engages the right-hand end of bar 45 and normally maintains the left-hand end of the bar in engagement with the lead screw threads. Swingably supported on the block 44 by means of adjustable pivot screws 49, 50, is a metal casting comprising two parallel horizontal arms 51, 52, through which the screws 49 and 50 are threaded, and an inclined bracket 53 U-shaped in section and which is integrally fastened to the plates 51, 52. The upper inclined wall 54 of bracket 53 has an opening to receive a suitable condenser lens in the lens barrel 55. The left-hand vertical wall 56 of bracket 53 has a circular opening 57 through which passes the light barrel tube 58 having a partition 58*a* with a central aperture 58*b*. Welded or otherwise fastened to the wall 56 is a cylindrical casting 59 (Fig. 1) having a bore of the same diameter as the opening 57. Welded or otherwise fastened to the flange 60 on casting 59 is a bracket having an inclined portion 61 with upturned lugs 62, 63 (Fig. 3) through which are threaded respective thumb nut adjusting screws 64, 65. Supported on member 61 is a plate 66, which carries a block 67 having a circular bore to receive a slidable sleeve 68 which sleeve is adapted to frictionally grip the base 69 of the lamp bulb 70. The plate 66 is provided with a slot 71 through which passes a screw 72 threaded into the member 61. The plate 66 also has an upturned lug 73 (Fig. 3) which is adapted to be engaged by the ends of the adjusting screws 64, 65, so as to adjust the bulb 70 in the direction of the dotted line arrows (Fig. 2). For the purpose of adjusting the bulb 70 in the direction of the full line arrows, the sleeve 68 carries a rack member 74 which is adapted to be engaged by a pinion 75 rotatably mounted between the spaced portions 76, 77, of the block 67. A suitable thumb nut 78 is provided for turning the pinion 75. By this arrangement, the lamp 70 can be moved so as to adjust its filament (not shown) or similar spot light emitter in mutually perpendicular directions so as to bring it into proper focal relation with the condenser lens in the lens barrel 55.

As above mentioned, the light tube 58 passes through the casting 59, and if desired the tube 58 may be adjustably fastened with respect to said casting so as to provide the proper spaced relation between the lens barrel 79 and the surface of drum 14. The light tube 58 at one end (Figs. 1, 2 and 8) is telescopically supported in a tube 80 which in turn is swingably mounted on fixed bracket members 81, 82, by means of pivot screws 83, 84. The external diameter of tube 58 is only slightly smaller than the internal diameter of tube 80, so as not to impede the telescoping sliding motion of member 58 in tube 80. Fixedly mounted with respect to the tube 58, for example on a suitable bracket 85, is a box or other housing 86 for the light-sensitive or photo-electric cell 87, whose sensitive target or emitting electrode 88 is positioned in alignment with the bore of tube 58. The front wall of box 86 has a wide rectangular window 89 of about the same size as the cell electrode 88. The cell 87 has its terminals connected to any suitable photo-electric cell amplifier (not shown) preferably by the shortest possible conductors so as to reduce to a minimum the possibility of extraneous electrical pickup.

From the foregoing description, it will be seen that the parts 51 to 79 form a unitary assembly, the movement of which is controlled by the lead screw 42 and the follower unit 44, 45. Because of the swinging and telescopically sliding support for the left-hand end of member 58, and because of the pivoted support of this unitary assembly on the block 44 by means of pivot screws 49 and 50, a substantially uniform spaced relation is maintained between the center of the front face of lens 79 and the surface of the scanning drum 14. In plan view (Fig. 2), the front center point of lens 79 traverses an arcuate path around pivot point 83, however the actual linear distance "A" (Fig. 8) between the said lens center and the point where the extended central axis of the optical system of tube 58 intersects the drum, remains fixed. As the light tube 58 swings, the distance "C" (Fig. 8) varies, while the distance "B" of course is fixed. It will be understood that the pivot point 83 is arranged so that it is equidistant from the ends of the dum 14. Consequently, when the tube 58 is perpendicular to the surface of the drum, the distance "C," is a minimum. As the tube 58 assumes a position on either side of this perpendicular position, the distance "C" becomes greater because the center point of the front of lens 79 approaches the drum so as to compensate for the increased angular relation between the central longitudinal axis of tube 58 and the surface of the drum. The net result is that the actual linear distance between the front center point of lens 79 and the point where the extended central longitudinal axis of tube 58 intersects the drum 14, remains a fixed value throughout the entire swinging motion of tube 58. It should also be observed that the lens 55 is maintained exactly in focus as the tube 58 swings between the scanning limits since the pivot screws 49 and 50 are in the plane of the scanning area of the drum.

When the scanning operation is completed, it is necessary to return the lens system to its initial or normal position, as shown in Fig. 2, and for that purpose an additional lead screw 90 (Fig. 1) is provided, this screw being located parallel to and above screw 42 and driven continuously by the motor 43. For the sake of clarity, screw 90 is omitted from Fig. 2. The screw 90 acts as a fast return screw and accordingly it has a much coarser pitched thread than the screw 44. The metal bar 45 engages an eccentric bail or cam 91 (Figs. 1 and 4) which is eccentrically mounted at its ends in the end plates 17 and 18, and extends the full length of the lead screws and parallel thereto. An arm 92 is fastened to the eccentric shaft of member 91 and this arm is pivotally attached to a link 93 which at its lower end is pivotally attached to the lever 37. Thus, when the lever 37 is raised, it rotates the member 91 in a counter-clockwise direction causing the bar 45 to rotate clockwise around its pivot 46 so as to engage arm 45 in the thread of the return screw 90. The direction and pitch of the thread in screw 90 is such as to cause the lens system to be rapidly returned to its initial position as shown in Fig. 2. On the other hand, when the lever 37 is in its lowermost position, the member 91 is rotated clockwise enabling the arm 45 to rotate clockwise to the position shown in Fig. 1, and engage the thread in the main lead screw 42.

When loading the sheet 16 on to the drum, it is important that the drum be given sufficient rotational torque to insure that the member 19 is brought into registry with the loading hopper 11. For this purpose, there is mounted in the path of the lever 37 (Fig. 9) a delayed action switch 94 which completes the circuit through the winding of the starting motor 95. It should be observed that the drum 14 is adapted to be driven under control of two separate motors, namely the starting motor 95 which can be any suitable type of motor such as a direct current motor, and a synchronous motor 43 which is adapted to be driven at a predetermined synchronous speed under control of fixed frequency signals from a suitable source 97. The drum 14 can be coupled to the common shaft 98 of the two motors through a suitable gearing system 99 and a slip-friction clutch 100. By interposing the delay action switch 94 in the control circuit of motor 95, it is necessary that the lever 37 be raised relatively slowly so as to provide a certain minimum time of closure for the circuit of motor 95. If this delayed action switch were not provided and the lever 37 were suddenly raised, it would not enable the motor 95 to receive sufficient power to make sure that the drum 14 is brought to the loading position as shown in Figs. 5 and 7. The switch 94 may be of any well-known construction which will immediately close the contacts and delay the travel of the lever 37 that moves the latch 33 in the engagement with the lip 32 of the plate 21.

Likewise, when the sheet has been properly loaded and clamped on to the drum, it is necessary to transfer control from the motor 95 to the motor 43. Consequently, when the lever 37 is lowered from its raised position as represented by the dotted line in Fig. 9 to its normal position, it again re-engages the operating arm of switch 94. If the lever 37 is moved downwardly sufficiently slowly, it maintains the circuit of motor 95 closed for a predetermined time interval sufficient to bring the drum 14 up to or close to synchronous speed. Consequently, when the lever 37 reaches its lowermost or normal position, the drum 14 being close to synchronous speed, can then be driven under control of the synchronous signals applied to the motor 43 from the source 97.

The manner of operation of the mechanism will be clear from the foregoing description. When the drum 14 is to be loaded preliminary to scanning, the lever 37 is raised causing the member 33 to engage the lip 32 to stop the drum. The inward movement of member 33 also forces the clamping bar 19 to the right (Figs. 1 and 5) so that the lip 25 is in alignment with the loading slot 15. A sheet of paper 16 is then dropped into the hopper 11 so that the lower edge thereof enters the slot formed between the lip 25 and the drum surface. Preferably the hopper 11 is normally closed by a hinged cover 101 having a knob 102. It will be understood that preferably the sheet 16 has a length substantially equal to the circumference of the drum 14. The lever 37 is then lowered allowing the bar 19 to clamp the sheet 16 flush against the periphery of drum 14, which is thereupon free to rotate and carry with it the clamped sheet of paper in the direction of the arrow. As indicated in Fig. 6, the opposite end of the sheet 16 is unclamped but is prevented from flapping around to any great extent by the member 41. When the clamped sheet reaches the scanning region which is illuminated by the lamp 70 and the optical system 55, it is held flat against the surface of the drum by the tension spring 40. It will be understood that the lamp 70 is of a type which produces a substantially point light source and this point source is focussed by the lens system 55 upon an elemental area of the sheet 16 as the drum is being rotated as indicated by the dot-dash line (Fig. 1). The scanning point of light traverses the sheet 16 in a direction parallel to the axis of rotation of the drum in the well-known manner. The light from the illuminated elemental scanning spot on the sheet 16 is likewise reflected through the lens system 79 so as to excite the photo-electric cell 87 in the well-known manner. When the scanning of the sheet has been completed, the lever 37 can again be raised so as to unclamp the sheet which is thereupon allowed to drop through the exit opening 39. Preferably, although not necessarily, the light tube 58 is adjustable with respect to the casting 59 and may be held in place therein by means of suitable set screws 101.

Referring to Fig. 10, there is shown a modification of the foregoing arrangement and wherein the pivotally mounted sleeve 80 has its end portion adjacent the pivot, cut away as indicated by the numeral 104, so as to receive the light-sensitive cell 87. By this arrangement, the cell can be mounted so that the light-responsive electrode 88 is in substantial alignment with the pivot points 83 and 84, it being understood that the cutout portion 104 is sufficiently larger than the diameter of the cell 88 so as to enable the sleeve 80 to pivot between its extreme positions without coming into contact with the cell 87. In the foregoing embodiments, it will be observed that the cell 87 is of a type wherein the light-sensitive electrode 88 has substantial length so that for the extreme positions of the sleeve 80, the illuminated spot of the scanned subject matter on drum 14 is always imaged upon the said electrode 88.

While one particular embodiment has been described, it will be understood that various changes and modifications may be made therein without departing from the spirit and scope of the invention. For example, while in the particular embodiment disclosed the light source is mounted for movement as a unit together with the lens barrel 58, it will be understood that this is not entirely necessary. For example, as shown schematically in Fig. 11, the light source 105 may be of the elongated type stationarily mounted and provided with a corresponding stationary light slit 106 for projecting a linear strip of light which extends along the length of the subject matter on the drum, this narrow line of light being scanned along its entire length by the lens 79 and the successive elemental areas of this scanned line are selected by the aperture 58b for projection on the light-sensitive electrode 88. In the event that a stationary point light source is used, such as the "Point-o-lite" lamp 107 (Fig. 12), this lamp may be mounted in a stationary position substantially in vertical alignment with the pivot points 83, 84, and the tube 58 may carry a lens system represented schematically by the lens 108 and provided with a reflecting mirror 109 which reflects the light spot from source 107 on to the surface of the drum 14.

What is claimed is:

1. A facsimile scanning arrangement for scanning subject matter in successive elemental areas, comprising a rotatable scanning drum to which the subject matter is attached for scanning a scanning light source, means to move said light source transversely across the subject matter in the direction of the drum length and in a substantially straight line parallel to the rotational axis of the drum, a stationarily mounted light-sensitive cell, said cell having a light-sensitive electrode whose width is only a small fraction of the drum length, means to expose said cell to light reflected from said areas, and means to move said light source as a unit independently of said cell while maintaining said cell in substantial linear optical alignment with the successively scanned elemental areas.

2. A facsimile scanning arrangement for scanning subject matter in successive elemental areas, comprising a rotatable scanning drum to which the subject matter is attached for scanning, a scanning light source, a lens system associated with said light source and movable as a unit therewith transversely of the subject matter in the direction of the drum length and in a substantially straight line parallel to the rotational axis of the drum, a stationarily mounted light-sensitive cell said cell having a light-sensitive electrode whose width is only a small fraction of the drum length and means to move said light source and lens system as a unit independently of said cell while maintaining said light source and lens in substantially uniform linear optical spaced relation with respect to the subject matter being scanned.

3. A facsimile scanning arrangement for scanning subject matter in successive elemental areas, comprising a unitary assembly of light source, projection lens and objective lens; a lead screw for moving said assembly as a unit transversely of the subject matter, a stationarily mounted light-sensitive cell, means to support said assembly for swinging movement as a unit about a pivot adjacent said cell, and means to support said assembly for unitary swinging movement at a point adjacent said lead screw while maintaining substantially uniform linear optical spacing between the light source and lenses with respect to the subject matter.

4. A facsimile scanning arrangement comprising a rotatable scanning drum, a lead screw rotatable at predetermined speed with respect to the drum rotation, a lead screw follower, a light-sensitive cell stationarily mounted with respect to said drum, an objective lens located between the drum and said cell, a light source movable as a unit with said lens in the direction of the drum length, a substantially rigid tubular light barrel between said lens and said cell, means pivotally supporting said barrel at one end adjacent said cell, and means supporting said barrel at the other end adjacent the drum for unitary pivotal movement with respect to said follower.

5. A facsimile scanning arrangement according to claim 4 in which said light barrel comprises two telescopically slidable tubular sections one section being pivoted adjacent said cell and the other section being pivotally supported from said follower.

6. A facsimile scanning arrangement comprising a rotatable scanning drum, a lead screw rotatable at predetermined speed with respect to said drum rotation, a lead screw follower, means to support a scanning lamp and lens system as a unit on said follower but for pivoted movement with respect to said lead screw, a photoelectric cell stationarily mounted with respect to said lens system, and means to maintain said lens system in linear optical alignment with said cell during the entire scanning traverse of said unit.

7. A facsimile scanning arrangement according to claim 6 in which the last-mentioned means comprises a two-section telescoped light barrel with one section attached to said lamp and lens unit, and the other section pivotally supported adjacent said cell.

8. A facsimile scanning arrangement according to claim 6 in which said lens unit includes a projection lens for imaging a point of light from said source on the subject matter on said drum, and an objective lens for collecting the reflected light from the subject matter and passing it to said cell.

9. A facsimile scanning arrangement according to claim 6 in which said lamp unit is provided with means for adjusting the position of the lamp in two mutually perpendicular planes with respect to said lens unit.

10. A facsimile scanning arrangement comprising a rotatable scanning drum to support a facsimile subject matter thereon, a lamp and lens unit for projecting a scanning light spot on the subject matter on said drum and for collecting the reflected light therefrom, means to move said unit with respect to the drum so that the lens unit traverses a path which is substantially parallel to the rotational axis of said drum which path extends in a straight line across the width of said subject matter, a photoelectric cell stationarily mounted with respect to said lens unit and excited by the said collected reflected light, and means to maintain said cell in substantial linear optical alignment with respect to the successive elemental areas of the subject matter being scanned.

11. A facsimile scanning arrangement according to claim 10 in which said lamp and lens unit carries a tubular light barrel between the lens and cell, and means to maintain said light barrel in optical alignment between said lens and cell during the entire scanning movement of said unit.

12. A facsimile scanning arrangement according to claim 10 in which the means to move said unit with respect to the drum comprises a lead screw and lead screw follower, said unit being pivotally supported from said follower, and also being pivotally supported at a point adjacent said cell.

13. In a facsimile scanning machine of the lead screw and lead screw follower type, a lens system and a light barrel located between the subject matter being scanned and a stationarily mounted light-sensitive cell, said light barrel being in the form of two slidably telescoped tubular sections, one section mounted for pivotal movement adjacent the cell, the other being mounted for pivotal movement from said follower.

14. A facsimile scanning machine according to claim 13 in which said lens system and light barrel are mounted for swinging movement as a unit so as to preserve a fixed spacing between an objective lens carried by said barrel and the actual elemental area of the subject matter being scanned.

15. A facsimile scanning arrangement for scanning subject matter in successive elemental areas, comprising a rotatable scanning drum to which the subject matter is attached for scanning, a stationarily mounted light-sensitive cell, a substantially rigid lens barrel for collecting the light from each successive elemental area of the subject matter and conveying it to said cell, said lens barrel including a lens facing the subject matter, said barrel being pivotally supported at one end adjacent the drum and at the other end adjacent said cell and arranged to preserve a fixed spacing between the center of said lens and each elemental scanned area of the subject matter as it is scanned.

16. A facsimile scanning arrangement according to claim 15 in which said lens barrel system includes a two-part longitudinally extensible light confining tube.

17. A scanning arrangement according to claim 15 in which a stationarily mounted scanning light source is provided for providing scanning illumination of each of said elemental areas.

AUSTIN G. COOLEY.

REFERENCES CITED

The following references are of record in the file of this patent:

UNITED STATES PATENTS

| Number | Name | Date |
|---|---|---|
| Re. 19,575 | Finch | May 21, 1935 |
| 1,751,584 | Hansell | Mar. 25, 1930 |
| 1,834,330 | Brower | Dec. 1, 1931 |
| 2,021,894 | Morse | Nov. 26, 1935 |
| 2,201,474 | Carlson | May 21, 1940 |
| 2,262,715 | Wise | Nov. 11, 1941 |
| 2,381,461 | Morse | Aug. 7, 1945 |